(12) United States Patent
Koyama et al.

(10) Patent No.: US 8,282,218 B2
(45) Date of Patent: Oct. 9, 2012

(54) PROJECTOR HAVING DUCT FOR GUIDING AIR FROM EXHAUST FAN TO EXHAUST PORT

(75) Inventors: Mika Koyama, Matsumoto (JP); Kiyotaka Nakano, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 603 days.

(21) Appl. No.: 12/499,843

(22) Filed: Jul. 9, 2009

(65) Prior Publication Data

US 2010/0007858 A1   Jan. 14, 2010

(30) Foreign Application Priority Data

Jul. 14, 2008  (JP) ................................ 2008-182611

(51) Int. Cl.
*G03B 21/18* (2006.01)
*G03B 21/26* (2006.01)
(52) U.S. Cl. ................ 353/57; 353/58; 353/60
(58) Field of Classification Search .............. 353/57, 353/58, 60, 61
See application file for complete search history.

(56) References Cited

U.S. PATENT DOCUMENTS

| 6,558,004 | B2 | 5/2003 | Ito et al. |
| 6,746,125 | B2 | 6/2004 | Nakano et al. |
| 7,484,852 | B2 * | 2/2009 | Kuraie ......................... 353/57 |

FOREIGN PATENT DOCUMENTS

| JP | 11-119181 A | 4/1999 |
| JP | 2002-23261 A | 1/2002 |
| JP | 2002-107826 A | 4/2002 |
| JP | 2002-244215 A | 8/2002 |
| JP | 2002-365728 A | 12/2002 |
| JP | 2003-344949 A | 12/2003 |
| JP | 2006-011083 A | 1/2006 |
| JP | 2006-171165 A | 6/2006 |
| JP | 2006-343565 A | 12/2006 |
| JP | 2006-343566 A | 12/2006 |
| JP | 2007-093992 A | 4/2007 |

\* cited by examiner

*Primary Examiner* — Tony Ko
(74) *Attorney, Agent, or Firm* — AdvantEdge Law Group, LLC (57) ABSTRACT

A projector includes a light source device; an exhaust fan configured to take air in the vicinity of the light source device in and discharge the same; a power supply device configured to supply electric power to components of the projector; an outer casing configured to accommodate the light source device and the power supply device in the interior thereof and provided with an exhaust port formed thereon; and a first duct configured to guide the air discharged from the exhaust fan to the exhaust port, and the power supply device includes a second duct configured to guide the air in the interior of the power supply device toward the first duct, and an air incoming port configured to take the air discharged from the second duct into the first duct is formed with the first duct.

9 Claims, 5 Drawing Sheets

PROJECTOR HAVING DUCT FOR GUIDING AIR FROM EXHAUST FAN TO EXHAUST PORT

CROSS REFERENCE TO RELATED APPLICATIONS

The present application claims priority from Japanese Patent Application No. 2008-182611 filed on Jul. 14, 2008, which is hereby incorporated by reference in its entirety.

BACKGROUND

1. Technical Field

The present invention relates to a projector.

2. Related art

In the related art, a projector having a light source device, a light modulation device configured to form an image light by modulating a luminous flux emitted from the light source device according to image data, a projection optical device configured to project the image light in an enlarged scale, and a power supply device configured to supply an electric power to respective devices (See JP-A-2006-343565) is known. The projector disclosed in JP-A-2006-343565 includes a first cooling fan configured to cool the light source device, a second cooling fan configured to cool the power supply device, and a single exhaust fan configured to take hot air increased in temperature in by cooling the respective devices and exhaust the same out of the projector in addition to the respective devices as described above. The projector disclosed in JP-A-2006-343565 is configured to cool the light source device and the power supply device by the respective cooling fans, so that shortening of the lifetimes of the respective devices due to the increase in temperature of the respective devices can be prevented. Since the hot air from the respective devices is taken in by the single exhaust fan and is discharged out of the projector, the projector can be downsized in comparison with the case of providing the exhaust fans for the respective devices.

When providing the exhaust fans for the light source device and the power supply device respectively, the respective exhaust fans each must simply take the hot air from the device corresponding thereto. However, in the projector disclosed in JP-A-2006-343565, since the one exhaust fan must take the hot air from both devices in, and hence the exhaust fan must be driven at a high drive voltage correspondingly, so that there arises a problem of increase in noise generated by the exhaust fan.

SUMMARY

An advantage of some aspects of the invention is to provide a projector in which a noise generated by an exhaust fan is reduced.

A projector according to a first aspect of the invention includes a light source device; an exhaust fan configured to take air in the vicinity of the light source device in and discharge the same; a power supply device configured to supply electric power to components of the projector; an outer casing configured to accommodate the light source device and the power supply device in the interior thereof and provided with an exhaust port formed thereon; and a first duct configured to guide the air discharged from the exhaust fan to the exhaust port, in which the power supply device includes a second duct configured to guide the air in the interior of the power supply device toward the first duct, and an air incoming port configured to take the air discharged from the second duct into the first duct is formed with the first duct.

In this configuration, the exhaust fan takes hot air from the light source device in and discharges into the first duct. Then, the invention utilizes a flow of the hot air from the light source device generated by the exhaust fan, hot air from the power supply device is taken into the interior of the first duct from the air incoming port formed on the first duct, and exhausts out of the projector from the exhaust port together with the hot air of the light source device. Therefore, according to the aspect of the invention, the exhaust fan must simply take the hot air from the light source device, and does not need to take the hot air from the power supply device in, so that the exhaust fan can be driven at a low drive voltage (the number of revolutions can be reduced by reducing the drive voltage) correspondingly, and the noise generated by the exhaust fan can be reduced.

Preferably, the power supply device includes a circuit board, and the second duct includes a duct body configured to accommodate the circuit board in the interior thereof, and a connecting duct configured to connect the duct body and the first duct.

In this configuration, since the duct body is connected to the first duct via the connecting duct, the hot air in the duct body can be taken out from the air incoming port effectively via the connecting duct, so that the cooling efficiency of the power supply device is improved.

Preferably, the power supply device and the light source device are arranged in an L-shape, and the exhaust fan is located so as to be positioned inside the power supply device and the light source device arranged in the L-shape, and the first duct is extended toward the power supply device as it goes to a distal end.

In this configuration, since the first duct is extended toward the power supply device as it goes to the distal end, by forming the air incoming port on a wall surface portion on the side of the power supply device, the air incoming port can be arranged in the proximity of the duct body, so that the hot air discharged from the duct body can be introduced effectively from the air incoming port. In particular, when the second duct includes the connecting duct configured to connect the duct body and the first duct in addition to the duct body, since the first duct is extended toward the power supply device as it goes to the distal end, the connecting duct can be shortened correspondingly. Therefore, retention of the hot air discharged from the duct body into the connecting duct can be restrained, so that the power supply device can be reliably and preferably cooled.

Preferably, the exhaust fan is inclined in such a manner that the discharging side faces toward the power supply device.

In this configuration, since the exhaust fan is inclined in such a manner that the discharging side faces toward the power supply device, it is easy to cause the hot air from the exhaust fan to flow along a wall surface of the first duct on the side of the power supply device and, by forming the air incoming port on the wall surface portion of the first duct on the side of the power supply device, the hot air in the interior of the second duct can be taken in efficiently by the flow of the hot air.

Preferably, the first duct includes a air flow guide plate which causes the air discharged from the exhaust fan so as to flow along a wall surface formed with the air incoming port so as to provided in the interior thereof.

In this configuration, since the air flow guide plate is provided in the interior of the first duct, the hot air discharged from the exhaust fan can be flowed along the wall surface formed with the air incoming port efficiently by the air flow guide plate, so that the hot air in the interior of the second duct can be further efficiently taken in.

Preferably, the projector includes: a first cooling fan provided on an upstream side of a cooling air channel in the light source device and configured to discharge cooling air to the light source device; and a second cooling fan provided on the upstream side of the cooling air channel in the light source device and configured to discharge the cooling air to the power supply device.

According to a second aspect of the invention, a cooling system of a projector including a light source device and a power supply device configured to supply a power supply to the light source device includes: an exhaust port provided on a casing of the projector; a first duct includes an inlet port and, configured to guide air that cooled the light source device to the exhaust port; and an exhaust fan provided on a downstream side of a cooling air flow channel of the light source device and an upstream side of the cooling air flow channel of the first duct and configured to take air from the light source device, and the first duct is connected to the exhaust fan so as to take the air from the exhaust fan and exhaust the same from the exhaust port, and includes an incoming port configured to guide the air that cooled the power supply device, and the first duct guides the air take in from the light source device through the air incoming port and the air take in from the power supply through the air incoming port together to the exhaust port.

BRIEF DESCRIPTION OF THE DRAWINGS

The invention will be described with reference to the accompanying drawings where like numbers reference like elements.

DESCRIPTION OF EXEMPLARY EMBODIMENTS

General Configuration and Configuration of Outer Casing

Referring now to drawings, an embodiment of the invention will be described.

Figure 1:
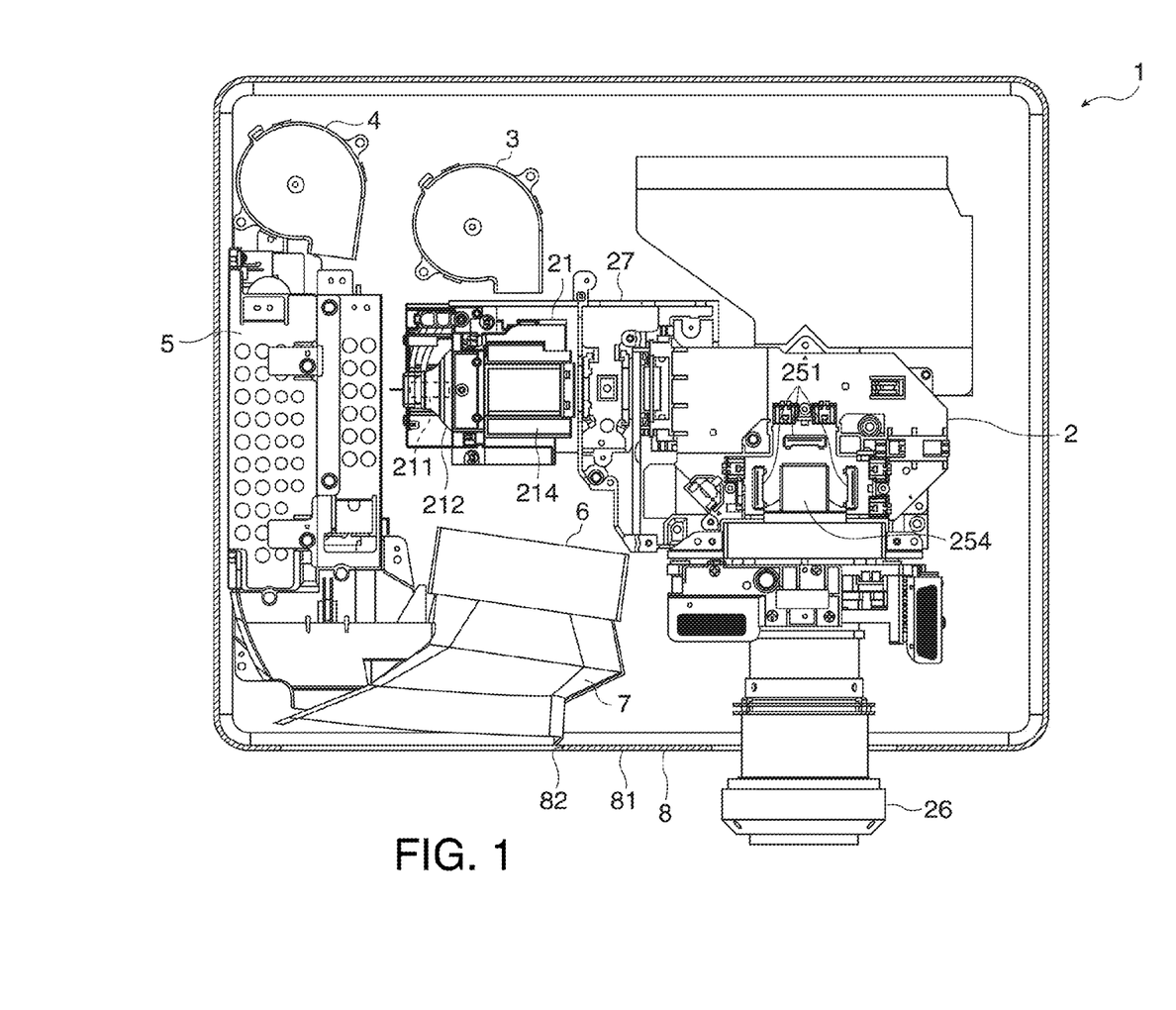
FIG. 1 is a plan view showing an internal configuration of a projector according to an embodiment.

FIG. 1 is a plan view showing an internal configuration of a projector 1 according to the embodiment.

The projector 1 modulates a luminous flux emitted from a light source according to image data and forms an image light, and projects the formed image light onto a screen or a wall surface in an enlarged scale. As shown in FIG. 1, the projector 1 includes an optical unit 2, a first cooling fan 3, a second cooling fan 4, a power supply device 5, an exhaust fan 6, a first duct 7, an outer casing 8 configured to accommodate the respective components 2 to 7 in the interior thereof, a control unit, not shown, configured to control the respective components 2 to 6, and a third cooling fan, not shown, configured to cool the optical unit 2.

The outer casing 8 is formed into a box shape. In such the outer casing 8, a front surface 81 which insert into a projecting lens 26 for emitting the image light is formed with an exhaust port 82, described later.

Configuration of Optical Unit

Figure 2:
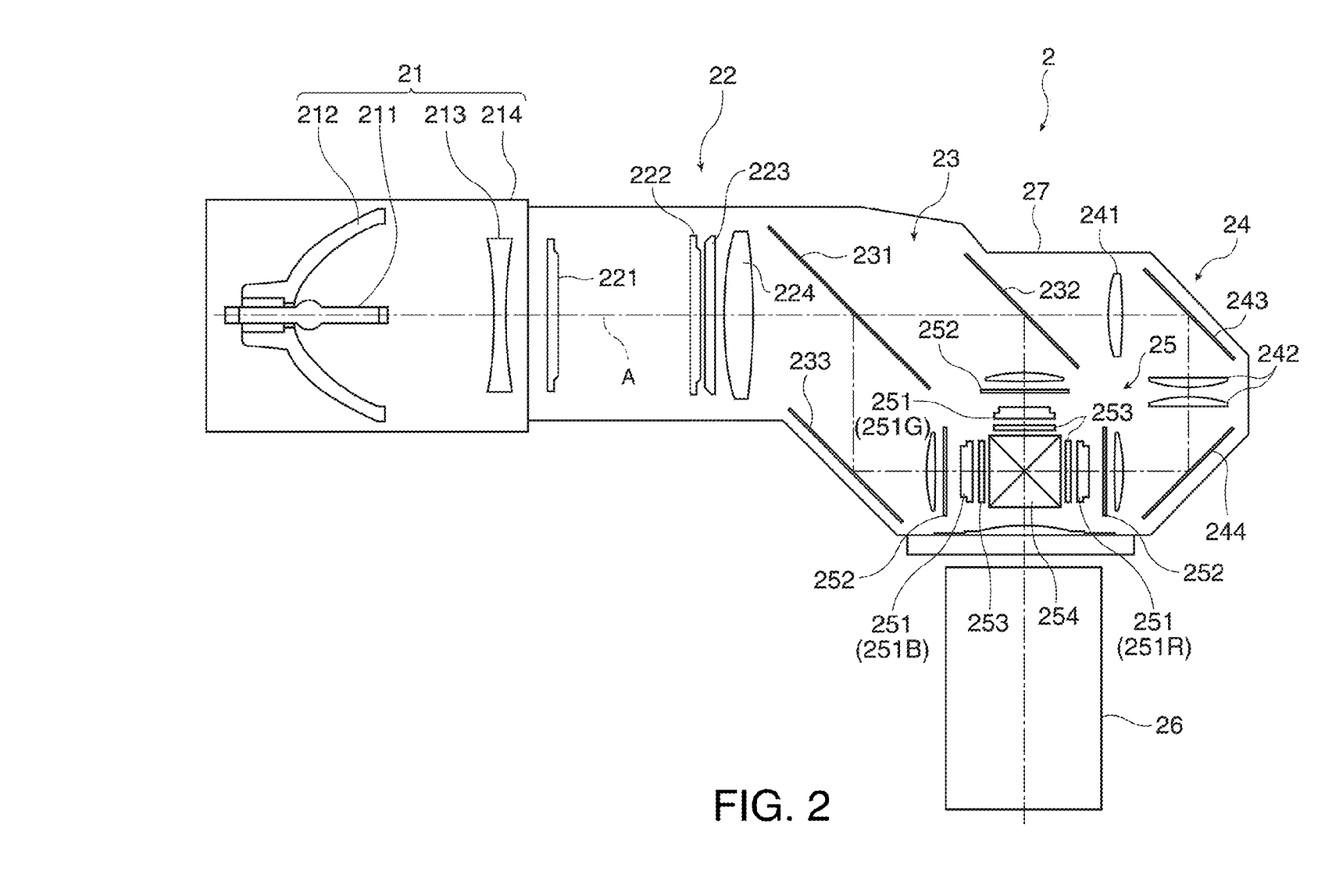
FIG. 2 is a diagrammatic sketch showing a configuration of an optical unit according to the embodiment.

FIG. 2 is a diagrammatic sketch showing a configuration of the optical unit 2.

The optical unit 2 modulates the luminous flux emitted from the light source according to the image data and projects the same in an enlarged scale under the control of the control unit. As shown in FIG. 2, the optical unit 2 includes a light source device 21, a lighting optical device 22, a color separating optical device 23, a relay optical device 24, an optical device 25, the projecting lens 26 as a projection optical device, and an optical part casing 27. The respective optical components 21 to 27 described above are used as optical systems in various types of general projectors, and hence only a brief description will be given below.

The light source device 21 includes a discharge type of a light source lamp 211, a reflector 212 configured to reflect a radiant flux emitted from the light source lamp 211, a concave lens 213 configured to convert the luminous flux reflected by the reflector 212 into parallel rays, and a lamp housing 214 configured to hold the respective members 211 to 213 and surround a space on the side of the reflecting surface of the reflector 212. Formed on a side surface on an upper side of the lamp housing 214 in FIG. 2 is an inlet port 2131 (see FIG. 3 and FIG. 4), and formed on a side surface on a lower side thereof in FIG. 2 is an exhaust port 2132 (see FIG. 3).

The lighting optical device 22 includes lens arrays 221, 222, a polarized light converting element 223, and a superimposed lens 224. The color separating optical device 23 includes dichroic mirrors 231, 232 and a reflecting mirror 233. The relay optical device 24 includes an incident-side lens 241, a relay lens 242, and reflecting mirrors 243, 244. The optical device 25 includes three liquid crystal panels 251 (a liquid crystal panel 251R on a red light side, a liquid crystal panel 251G on a green light side, and a liquid crystal panel 251B on a blue light side) as light modulating devices configured to modulate the luminous flux emitted from the light source device 21 according to the image data of the control device, and a cross-dichroic prism 254 as a color synthesizing optical device configured to combine the luminous fluxes modulated by three incident-side polarizing plates 252, three outgoing-side polarizing plates 253, and the three liquid crystal panels 251 to form the image light (color image) under the control of the control device. The projecting lens 26 projects the image light in an enlarged scale. The optical part casing 27 supports and fixes the respective optical components 22 to 26 at predetermined position with respect to an illumination optical axis A set in the interior thereof.

Configurations of First and Second Cooling Fans

Figure 3:
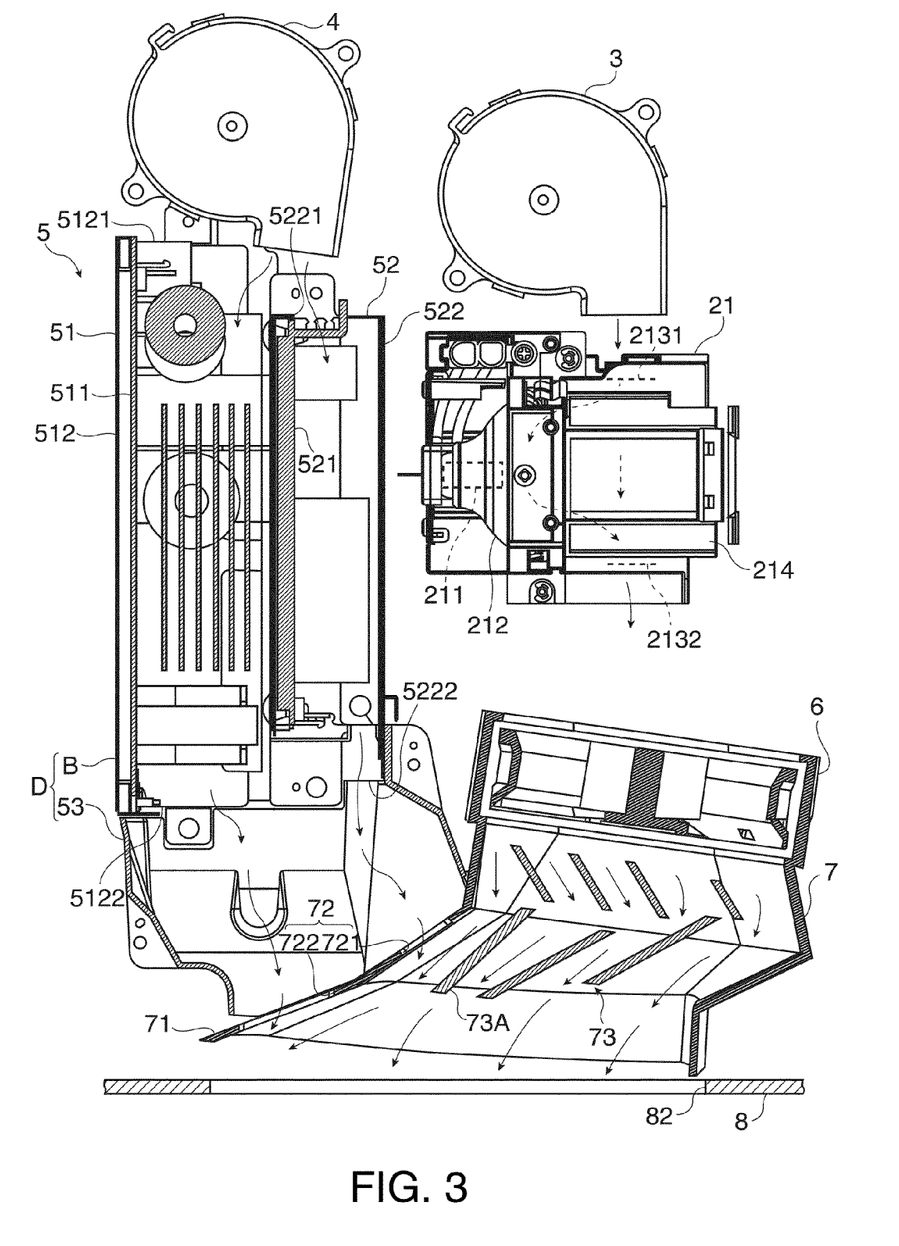
FIG. 3 is an enlarged drawing showing respective members relating to cooling of a light source device and a power supply device according to the embodiment.

FIG. 3 is an enlarged drawing showing the respective members 3, 4, 6, and 7 relating to cooling of the light source device 21 and the power supply device 5. The power supply device 5, the exhaust fan 6, and the first duct 7 are shown in cross sections.

The first cooling fan 3 is a sirocco fan, and is connected to the inlet port 2131 of the lamp housing 214 via the connecting duct on the side of the lamp, not shown. The first cooling fan 3 takes air in the interior of the projector 1 in, and discharges the air toward the light source device 21 as cooling air. The cooling air discharged from the first cooling fan 3 is introduced into the lamp housing 214 from the inlet port 2131 via the connecting duct on the lamp side. Then, as shown in FIG.

3, the cooling air, after having cooled the light source lamp 211 or the like and becomes hot air, is discharged from the exhaust port 2132 out of the lamp housing 214, and is taken in by the exhaust fan 6.

The second cooling fan 4 is a sirocco fan, and takes air in the interior of the projector 1, and discharges the air toward the power supply device 5 as the cooling air.

Configuration of Power Supply Device

The power supply device 5 supplies the electric power to respective components of the projector 1 such as the light source device 21 or the control device described above. As shown in FIG. 3, the power supply device 5 is arranged in such a manner that the longitudinal direction lies orthogonally to the direction of emission of the luminous flux of the light source device 21. In other words, in this embodiment, the power supply device 5 and the light source device 21 are arranged in an L-shape. The power supply device 5 includes a power supply block 51, a lamp drive block 52 as a light source device drive block, and a connecting duct 53.

The power supply block 51 includes a circuit board 511 and a power supply casing 512 configured to accommodate the circuit board 511 in the interior thereof.

The circuit board 511 includes a circuit element such as a transformer configured to convert an entered alternating current to a direct current at a low voltage and a converting circuit configured to convert an output from the transformer to a predetermined voltage, and supplies the electric power supplied from the outside to the lamp drive block 52 or the control device as described above.

The power supply casing 512 is formed into a substantially parallelepiped box-shape. Formed on a surface on one end side along the longitudinal direction of the power supply casing 512 is an inlet port 5121 connected to the second cooling fan 4 via the connecting duct on the side of the power supply, not shown, and formed on a surface on the other end side is an exhaust port 5122 configured to communicate the interior of the power supply casing 512 and the interior of the connecting duct 53. The cooling air discharged from the second cooling fan 4 is introduced into the interior of the power supply casing 512 from the inlet port 5121 via the connecting duct on the side of the power supply, cools the circuit board 511, and then, is discharged from the exhaust port 5122 into the connecting duct 53. The connecting duct on the side of the power supply is bifurcated, and feeds the cooling air discharged from the second cooling fan 4 into the interior of the power supply casing 512 and also into the interior of the lamp drive block 52.

The lamp drive block 52 includes a circuit board 521, and a lamp casing 522 configured to accommodate the circuit board 521 in the interior thereof.

The circuit board 521 includes a converting circuit configured to supply the electric power to the light source device 21 at a stable voltage, converts a DC current entered from the circuit board 511 of the power supply block 51 into an AC square wave current and supplies the same to the light source device 21.

The lamp casing 522 is formed into the substantially parallelepiped box shape. Formed on a surface on one end side along the longitudinal direction of the lamp casing 522 is an inlet port 5221 connected to the second cooling fan 4 via the above-described connecting duct on the side of the power supply, and formed on a surface on the other end side is an exhaust port 5222 configured to communicate the interior of the lamp casing 522 and the interior of the connecting duct 53. The cooling air discharged from the second cooling fan 4 is introduced into the interior of the lamp casing 522 from the inlet port 5221 via the connecting duct on the side of the power supply, cools the circuit board 521, and then, after having become hot air, is discharged from the exhaust port 5222 into the connecting duct 53.

As shown in FIG. 3, the connecting duct 53 is connected at one end thereof to the power supply casing 512 and the lamp casing 522, and at the other end thereof to the first duct 7, and hot air from the interiors of the power supply casing 512 and the lamp casing 522 is delivered into the interior of the first duct 7, described later in detail. In this embodiment, the power supply casing 512 and the lamp casing 522 constitute a duct body B, and the duct body B and the connecting duct 53 constitute a second duct D.

Configuration of Exhaust Fan

The exhaust fan 6 is an axial fan, and is inclined so as to be positioned inside the power supply device 5 and the light source device 21 arranged in the L-shape in such a manner that the discharging side faces toward the power supply device 5. The exhaust fan 6 takes hot air in the vicinity of the light source device 21 discharged from the light source device 21 in and discharges the same into the first duct 7.

Configuration of First Duct

As shown in FIG. 3, the first duct 7 is connected at one end thereof to the discharging side of the exhaust fan 6 and is arranged at the other end thereof in the vicinity of the exhaust port 82 of the outer casing 8, and discharges the hot air discharged from the exhaust fan 6 to the outside via the exhaust port 82. The first duct 7 is extended toward the power supply device 5 as it goes to the distal end thereof.

Figure 4:
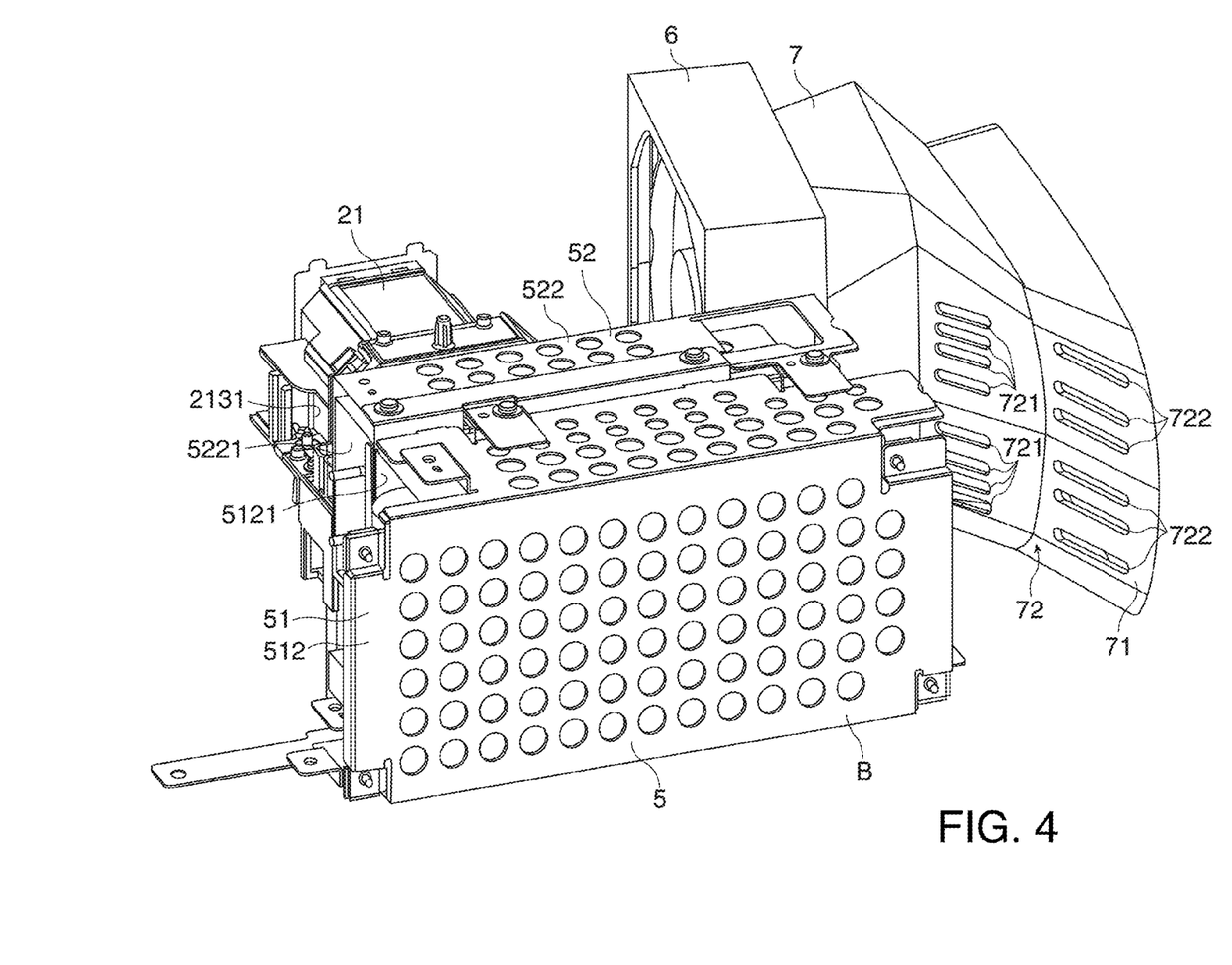
FIG. 4 is a perspective view showing an air incoming port according to the embodiment.

FIG. 4 is a perspective view showing an air incoming port 72 of the first duct 7.

As shown in FIG. 4, a wall surface 71 of the first duct 7 on the side of the power supply device 5 is formed with the air incoming port 72 at a portion opposing the distal end portions (exhaust ports 5122, 5222) of the duct body B. The air incoming port 72 includes a plurality of first air incoming ports 721 formed on a proximal end side of the wall surface 71 and a plurality of second air incoming ports 722 formed on the distal end side of the wall surface 71. Provided in the first duct 7 are a plurality of air flow guide plate 73 (FIG. 3) for guiding a flow of the hot air from the exhaust fan 6 efficiently to the exhaust port 82. The air flow guide plate 73 also serve to prevent the light emitted from the exhaust port 2132 of the lamp housing 214 from leaking out of the projector 1 via the exhaust port 82.

Figure 5:
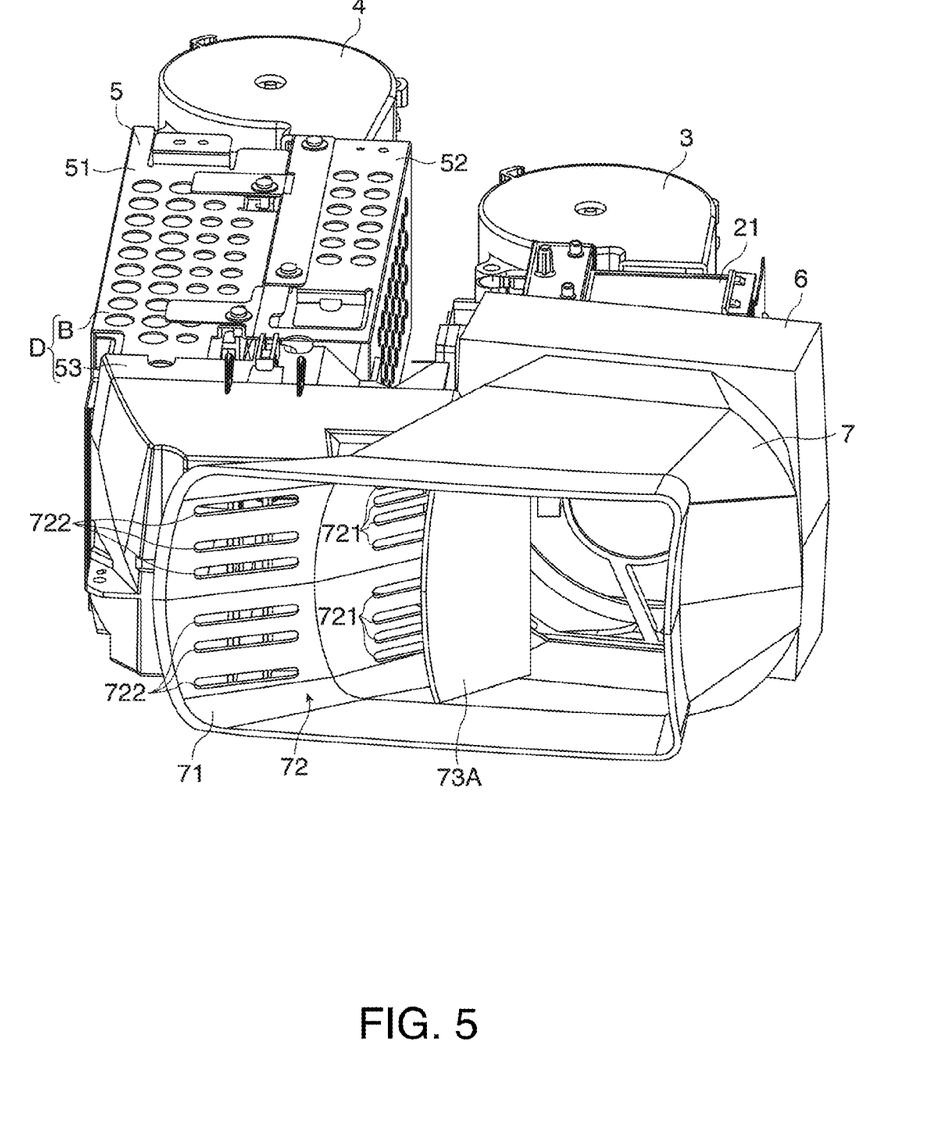
FIG. 5 is a perspective view showing a vacuum air flow guide plate of a first duct according to the embodiment.

FIG. 5 is a perspective view showing a vacuum air flow guide plate 73A. Other air flow guide plate 73 are not shown.

As shown in FIG. 3 and FIG. 5, the air flow guide plate 73 on the side of the wall surface 71 formed with the air incoming port 72 from among these air flow guide plate 73 corresponds to the vacuum air flow guide plate 73A. The proximal end side of the vacuum air flow guide plate 73A is provided on an upstream side of the first air incoming ports 721, and the distal end side thereof is provided on the downstream side of the first air incoming ports 721 so that the distal end side is farther from the wall surface 71 than the the proximal end side. The vacuum air flow guide plate 73A increases a flow rate of the hot air by squeezing the hot air discharged from the exhaust fan 6 by the proximal end portion with respect to the wall surface 71, and then allows the hot air to flow along the wall surface 71.

With the flow of the hot air along the wall surface 71, the first duct 7 side has a negative pressure with respect to the connecting duct 53 side. Therefore, the hot air discharged from the power supply block 51 and the lamp drive block 52 into the interior of the connecting duct 53 is taken into the flow of the hot air from the power supply device 5 along the wall surface 71 via the air incoming port 72, and is discharged out of the projector 1 from the exhaust port 82 together with the hot air from the power supply device 5.

The exhaust fan 6 takes the hot air from the light source device 21 in and discharges the same into the first duct 7. Then, using the flow of the hot air from the light source device 21 generated by the exhaust fan 6, the hot air from the power supply device 5 is taken into the interior of the first duct 7 from the air incoming port 72 formed on the first duct 7, and exhausts out of the projector 1 from the exhaust port 82 together with the hot air from the light source device 21. Therefore, according to the embodiment, the exhaust fan 6 must simply take the hot air from the light source device 21, and does not need to take the hot air from the power supply device 5 in, so that the exhaust fan 6 can be driven at a low drive voltage correspondingly, and the noise generated by the exhaust fan 6 can be reduced.

Since the duct body B accommodating the circuit boards 511, 521 in the interior thereof is connected to the first duct 7 via the connecting duct 53, the hot air in the duct body B can be taken in from the air incoming port 72 effectively to the first duct 7 via the connecting duct 53, so that improvement of the cooling efficiency of the power supply device 5 is achieved.

The first duct 7 is extended toward the power supply device 5 as it goes to the distal end side, and the wall surface 71 portion of the first duct 7 which faces the distal end portion of the duct body B is formed with the air incoming port 72. Therefore, the connecting duct 53 can be shortened by an amount corresponding to the extent of extending of the first duct 7 toward the power supply device 5, so that the retention of the hot air discharged from the duct body B in the connecting duct 53 can be restrained. Therefore, the cooling efficiency of the power supply device 5 can be further improved.

Since the exhaust fan 6 is inclined in such a manner that the discharging side faces toward the power supply device 5, it is easy to cause the hot air from the exhaust fan 6 to flow along the wall surface 71 of the first duct 7 on the side of the power supply device 5, and the hot air in the interior of the connecting duct 53 can be taken into the first duct efficiently by the flow of the hot air.

Since the vacuum air flow guide plate 73A is provided in the interior of the first duct 7, the hot air discharged from the exhaust fan 6 can be flowed along the wall surface 71 formed with the air incoming port 72 efficiently by the vacuum air flow guide plate 73A, so that the hot air in the interior of the connecting duct 53 can be further efficiently taken into the first duct 7.

Modification

The invention is not limited to the embodiments described above, and includes modifications and improvements within a scope which achieves the advantages of the invention.

For example, although the second duct D includes the duct body B and the connecting duct 53 in the embodiment, the second duct D must simply be able to guide the hot air in the second duct D to the wall surface 71 side of the first duct 7 on which the air incoming port 72 is formed, and may include only the duct body B or only the connecting duct 53.

In the embodiment described above, the air incoming port 72 is formed on the wall surface 71 on the side of the power supply device 5. However, the air incoming port 72 can be formed on the first duct 7 at an arbitrary position so as to allow the hot air in the duct body B to be guided to the arbitrary position by the connecting duct 53.

Although the power supply device 5 includes the power supply block 51 and the lamp drive block 52 in the embodiment, it may include only the power supply block 51. Also, the power supply block 51 and the lamp drive block 52 can be integrated.

Although the vacuum air flow guide plate 73A is provided in such a manner that the distal end side is farther from the wall surface 71 than the proximal end side in the embodiment described above, the vacuum air flow guide plate 73A can be provided in parallel to the wall surface 71.

Although the light modulation device includes the liquid crystal panels 251 in the embodiment described above, the light modulation device can be a DMD (Digital Micromirror Device: Trade Mark of United States Texas Instruments Incorporated).

Being able to reduce the noise from the exhaust fan, the invention can be applied to the projectors used for presentation or home theaters.

What is claimed is:

1. A projector comprising:
a light source device;
an exhaust fan configured to take air in the vicinity of the light source device in and discharge the same;
a power supply device configured to supply electric power to components of the projector;
an outer casing configured to accommodate the light source device and the power supply device in the interior thereof and provided with an exhaust port formed thereon; and
a first duct connected to the exhaust fan so as to guide the air discharged from the exhaust fan to the exhaust port, wherein:
the exhaust fan is provided on a downstream side of a cooling air flow channel of the light source device and an upstream side of a cooling air flow channel of the first duct,
the power supply device includes a second duct configured to guide the air in the interior of the power supply device toward the first duct, and
an air incoming port configured to take the air discharged from the second duct into the first duct is formed with the first duct.

2. The projector according to claim 1,
wherein the power supply device further includes a circuit board, and
the second duct includes a duct body configured to accommodate the circuit board in the interior thereof, and a connecting duct configured to connect the duct body and the first duct.

3. The projector according to claim 1,
wherein the power supply device and the light source device are arranged in an L-shape,
the exhaust fan is located so as to be positioned inside the power supply device and the light source device arranged in the L-shape, and
the first duct is extended toward the power supply device as it goes to a distal end.

4. The projector according to claim 3,
wherein the exhaust fan is inclined in such a manner that the discharging side faces toward the power supply device.

5. The projector according to claim 1,
wherein the first duct includes an air flow guide plate which causes the air discharged from the exhaust fan so as to flow along a wall surface formed with the air incoming port provided in the interior thereof.

6. The projector according to claim 1, further comprising:
a first cooling fan provided on an upstream side of a cooling air channel in the light source device and configured to discharge cooling air to the light source device; and
a second cooling fan provided on the upstream side of the cooling air channel in the light source device and configured to discharge the cooling air to the power supply device.

7. A cooling system of a projector including a light source device and a power supply device configured to supply a electric power to the light source device comprising:
an exhaust port provided on a casing of the projector;
a first duct includes an inlet port and configured to guide air that cooled the light source device to the exhaust port; and
an exhaust fan provided on a downstream side of a cooling air flow channel of the light source device and an upstream side of the cooling air flow channel of the first duct and configured to take air from the light source device, wherein
the first duct is connected to the exhaust fan so as to take the air from the exhaust fan and exhaust the same from the exhaust port, and includes an air incoming port configured to guide the air that cooled the power supply device, and
the first duct guides the air taken in from the light source device through the inlet port and the air take in from the power supply through the air incoming port together to the exhaust port.

8. A projector comprising:
a light source device;
an exhaust fan configured to take air in the vicinity of the light source device in and discharge the same;
a power supply device configured to supply electric power to components of the projector;
an outer casing configured to accommodate the light source device and the power supply device in the interior thereof and provided with an exhaust port formed thereon; and
a first duct configured to guide the air discharged from the exhaust fan to the exhaust port,
wherein:
the power supply device includes a second duct configured to guide the air in the interior of the power supply device toward the first duct,
an air incoming port configured to take the air discharged from the second duct into the first duct is formed with the first duct,
the power supply device and the light source device are arranged in an L-shape,
the exhaust fan is located so as to be positioned inside the power supply device and the light source device arranged in the L-shape, and
the first duct is extended toward the power supply device as it goes to a distal end.

9. The projector according to claim 8,
wherein the exhaust fan is inclined in such a manner that the discharging side faces toward the power supply device.

* * * * *